United States Patent
Ziebart et al.

(10) Patent No.: US 11,427,255 B2
(45) Date of Patent: Aug. 30, 2022

(54) METHOD AND SYSTEM FOR SUPPORTING A COUPLING OPERATION OF A TRANSPORTATION VEHICLE TO A TRAILER

(71) Applicant: VOLKSWAGEN AKTIENGESELLSCHAFT, Wolfsburg (DE)

(72) Inventors: Sascha Ziebart, Braunschweig (DE); Frank Schwitters, Königslutter (DE); Chrystian Knoppek, Berlin (DE); Hermann Gebert, Berlin (DE); Benedikt Michl, Berlin (DE)

(73) Assignee: Volkswagen Aktiengesellschaft

( * ) Notice: Subject to any disclaimer, the term of this patent is extended or adjusted under 35 U.S.C. 154(b) by 776 days.

(21) Appl. No.: 16/280,117

(22) Filed: Feb. 20, 2019

(65) Prior Publication Data
US 2019/0256139 A1   Aug. 22, 2019

(30) Foreign Application Priority Data
Feb. 21, 2018   (DE) ..................... 10 2018 202 613.0

(51) Int. Cl.
*B62D 15/02* (2006.01)
*B62D 13/00* (2006.01)
(Continued)

(52) U.S. Cl.
CPC .......... *B62D 15/0285* (2013.01); *B60D 1/36* (2013.01); *B62D 13/00* (2013.01); *B62D 15/025* (2013.01); *B60Q 9/006* (2013.01)

(58) Field of Classification Search
CPC .... B62D 15/0285; B62D 15/025; B60D 1/36; B60Q 9/006
See application file for complete search history.

(56) References Cited

U.S. PATENT DOCUMENTS

| 7,429,051 B2 | 9/2008 | Bauer et al. |
| 10,336,295 B2 | 7/2019 | Heller et al. |

(Continued)

FOREIGN PATENT DOCUMENTS

| CN | 105939897 A | 9/2016 |
| DE | 102004008928 A1 | 9/2005 |

(Continued)

OTHER PUBLICATIONS

Search Report for German Patent Application No. 10 2018 202 613.0; dated Oct. 17, 2018.

(Continued)

*Primary Examiner* — Dale W Hilgendorf
(74) *Attorney, Agent, or Firm* — Barnes & Thornburg, LLP

(57) ABSTRACT

A method for supporting a process of coupling a transportation vehicle to a trailer wherein a position of a coupling element on the trailer is detected by a trailer coupling assistant and the transportation vehicle is at least partly autonomously maneuvered into a target position in which a trailer coupling of the transportation vehicle is disposed in a specified position for coupling to the coupling element on the trailer, wherein a rearward monitoring region of the transportation vehicle is monitored by a parking aid during the maneuvering process. The parking aid is operated in a standard mode in response to the trailer coupling assistant being deactivated and the parking aid is operated in a coupling mode in which obstacle warnings relating to the rearward region are output by the parking aid differently from in the standard mode in response to the trailer coupling assistant being activated.

18 Claims, 2 Drawing Sheets

(51) Int. Cl.
  *B60D 1/36*   (2006.01)
  *B60Q 9/00*   (2006.01)

(56) References Cited

U.S. PATENT DOCUMENTS

| | | | | |
|---|---|---|---|---|
| 2011/0205088 A1* | 8/2011 | Baker | .................... | B60Q 9/006 |
| | | | | 340/932.2 |
| 2014/0012465 A1* | 1/2014 | Shank | ................ | B62D 15/0285 |
| | | | | 701/36 |
| 2016/0304122 A1* | 10/2016 | Herzog | ............. | B62D 15/0295 |
| 2017/0043807 A1* | 2/2017 | Shepard | ................... | B60D 1/36 |
| 2019/0121351 A1* | 4/2019 | Niewiadomski | ....... | B62D 6/002 |
| 2020/0189336 A1* | 6/2020 | Sharma | ................. | B60D 1/366 |
| 2021/0284234 A1* | 9/2021 | Kokaki | ................ | B62D 15/025 |
| 2021/0284238 A1* | 9/2021 | Raeis Hosseiny | ....... | B60D 1/36 |

FOREIGN PATENT DOCUMENTS

| | | |
|---|---|---|
| DE | 102004043761 A1 | 3/2006 |
| DE | 102005052238 A1 | 5/2007 |
| DE | 102009030452 A1 | 3/2010 |
| DE | 102009034106 A1 | 4/2010 |
| DE | 102009045284 A1 | 4/2011 |
| DE | 102010004920 A1 | 7/2011 |
| DE | 102011011144 A1 | 3/2012 |
| DE | 102012005707 A1 | 10/2012 |
| DE | 102014110498 A1 | 1/2016 |
| DE | 102014113293 A1 | 3/2016 |
| EP | 2394855 A1 | 12/2011 |
| EP | 2682329 A1 | 1/2014 |
| WO | 2005080100 A1 | 9/2005 |
| WO | 2016207171 A1 | 12/2016 |

OTHER PUBLICATIONS

Office Action for Chinese Patent Application No. 201910114241.1; dated Dec. 2, 2021.

* cited by examiner

METHOD AND SYSTEM FOR SUPPORTING A COUPLING OPERATION OF A TRANSPORTATION VEHICLE TO A TRAILER

PRIORITY CLAIM

This patent application claims priority to German Patent Application No. 10 2018 202 613.0, filed 21 Feb. 2018, the disclosure of which is incorporated herein by reference in its entirety.

SUMMARY

Illustrative embodiments relate to a method and a system for supporting a process of coupling a transportation vehicle to a trailer. Illustrative embodiments also relate to a transportation vehicle with such a system.

BRIEF DESCRIPTION OF THE DRAWINGS

The features and combinations of features mentioned in the description and the features and combinations of features mentioned in the description of the figures and/or shown in the figures alone can be used not only in the respective specified combination, but also in other combinations or on their own. Disclosed embodiments will be described in more detail below in connection with the figures, in which.

DETAILED DESCRIPTION

Figure 1:
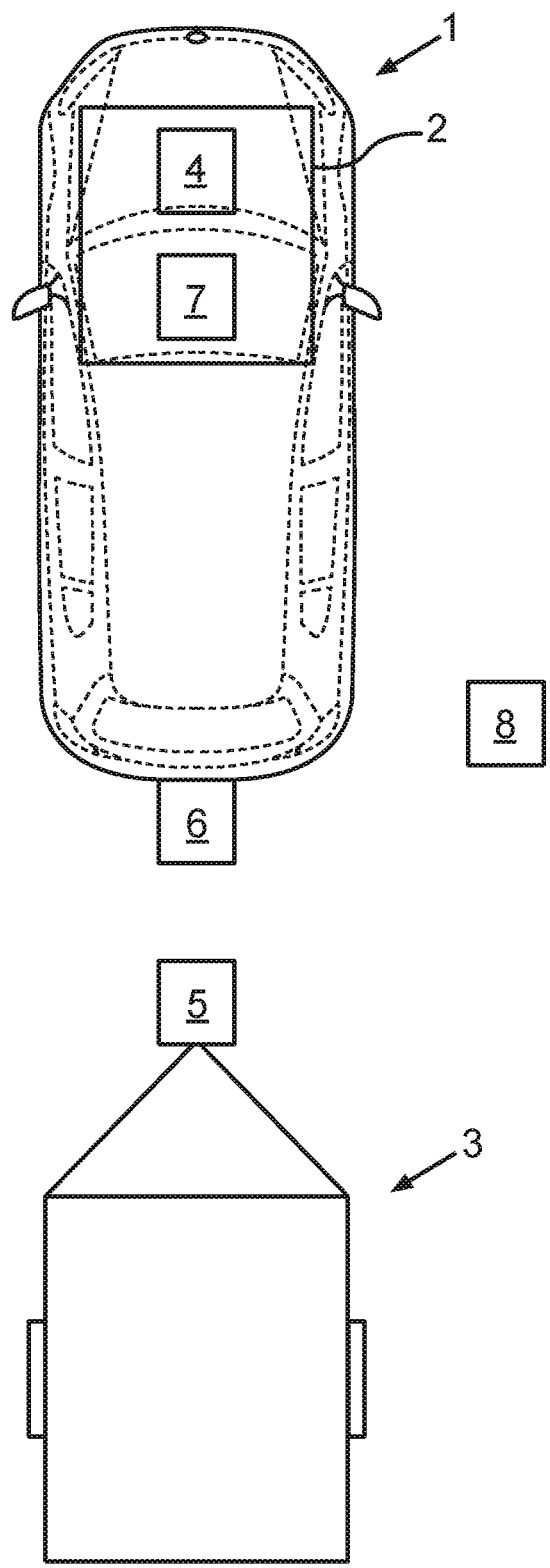
FIG. 1 shows a schematic representation of a process of coupling a transportation vehicle to a trailer.

Methods and systems for supporting a process of coupling a transportation vehicle to a trailer are already known. Thus, for example, DE 2009 045 284 A1 describes an automated system for supporting a process of coupling a transportation vehicle to a trailer. The automated system carries out necessary steering interventions to maneuver the transportation vehicle to the trailer automatically, wherein a driver only has the task of carrying out the longitudinal control of the transportation vehicle, i.e., to accelerate or to decelerate the transportation vehicle appropriately. In addition, the distance of the transportation vehicle from the trailer can be displayed visibly and audibly.

Further methods and systems for supporting a process of coupling a transportation vehicle to a trailer are also revealed in DE 10 2005 052 238 A1, DE 10 2009 030 452 A1, DE 10 2010 004 920 A1 and DE 10 2004 008 928 A1, for example.

Disclosed embodiments provide a solution by which a user is well supported during a process of coupling a transportation vehicle to a trailer.

This is achieved by a method and by a system for supporting a process of coupling a transportation vehicle to a trailer.

With the disclosed method for supporting a process of coupling a transportation vehicle to a trailer, a position of a coupling element on the trailer is detected by a trailer coupling assistant and based on this the transportation vehicle is maneuvered at least partly autonomously into a target position in which a trailer coupling of the transportation vehicle is disposed in a specified coupling position relative to the trailer coupling element. For example, a reversing camera can be used in combination with image processing to detect the position of the coupling element on the trailer, for example, as a trailer claw or similar. Based on the detected position of the coupling element on the trailer and with knowledge of the relative positioning of the trailer coupling of the transportation vehicle to the coupling element on the trailer, the trailer coupling assistant can plan a trajectory that the transportation vehicle must drive along to reach the mentioned target position.

During the maneuvering process, a rearward monitoring region of the transportation vehicle is monitored by a parking aid. The parking aid can, for example, comprise ultrasonic sensors, radar sensors or similar to monitor the rearward monitoring region of the transportation vehicle during the maneuvering process. The trailer coupling assistant can carry out the maneuvering process partly autonomously or even fully autonomously. For example, it is possible that a driver of the transportation vehicle only has to operate the gas pedal and the brake, wherein the trailer coupling assistant carries out all the steering processes for reaching the target position fully automatically. Alternatively, it is however also possible that the trailer coupling assistant carries out the entire maneuvering process fully automatically. In this case, the driver can, for example, be sitting in the transportation vehicle. Alternatively however, it is also possible that a user can remotely control the transportation vehicle and thereby the trailer coupling assistant with the user's smartphone, for example, wherein the trailer coupling assistant carries out the maneuvering process fully automatically until reaching the target position, as long as it is detected that the user has placed the user's finger on a certain mechanical control button or an only displayed control button of the smartphone, for example.

The disclosed method is characterized in that the parking aid is operated in a standard mode when the trailer coupling assistant is deactivated, whereas when the trailer coupling assistant is activated the parking aid is operated in a coupling mode, in which obstacle warnings related to the rearward region are output by the parking aid differently than in the standard mode. In other words, it is thus provided to operate the parking aid during the maneuvering process by the trailer coupling assistant differently than would be the case as standard during pure reversing or quite generally when maneuvering when the parking aid is activated.

The disclosed embodiments are based on the knowledge that contradictory obstacle warnings for a user of the transportation vehicle can occur in the case of a purely conventional operating mode of the parking aid when the trailer coupling assistant is activated at the same time. I.e., if the parking aid were to be operated in the standard mode both with the trailer coupling assistant activated and deactivated, it could occur, for example, that a continuous warning tone is output during reversing maneuvering of the transportation vehicle towards the trailer on coming within a certain distance from the trailer, especially from coupling elements on the trailer. This is usually the highest warning level for current parking aids and indicates to the driver that he/she should not continue moving. However, if the detected obstacle is the coupling element on the trailer, then the driver must continue despite the continuous warning tone, because the driver has not yet reached the mentioned target position, in which the trailer coupling of the transportation vehicle is disposed in the specified coupling position relative to the coupling element on the trailer. Despite the highest warning level the driver would also have to continue because the mentioned target position is, for example, still at a distance of 10 to 15 centimeters away from the sounding of the continuous warning tone.

The disclosed solution addresses exactly this problem. Because of the fact that when the trailer coupling assistant is activated the parking aid is operated in the mentioned coupling mode, in which obstacle warnings relating to the rearward region are output by the parking aid differently from in the standard mode, conflict-free obstacle warnings can be output when maneuvering the transportation vehicle by the trailer coupling assistant. While maneuvering towards the trailer the parking aid thus outputs different obstacle warnings than would be the case, for example, during pure reversing, for example, if the transportation vehicle is approaching a wall or similar.

This is achieved by communicating to the parking aid whether the trailer coupling assistant is currently active or not, in particular, whether the trailer coupling assistant is currently maneuvering the transportation vehicle towards the target position at least partly autonomously. A warning strategy of the parking aid can thus be adapted to the activated trailer coupling assistant, so that a driver or user of the transportation vehicle is not irritated by possibly conflicting obstacle warnings from the parking aid during the process of maneuvering into the target position. This is because during the process of coupling to the trailer it is now necessary that the transportation vehicle is at less than a usual minimum distance from the coupling element on the trailer from which a highest warning level of the parking aid is reached in the stationary mode.

A disclosed embodiment provides that the position of the coupling element on the trailer is communicated to the parking aid in the coupling mode, wherein if an object is disposed in the rearward monitoring region and within a specified perimeter around the position of the coupling element on the trailer, the parking aid does not carry out the output of an obstacle warning that would otherwise be output in the standard mode. In other words, a type of masking out of the coupling element on the trailer is thus provided. With knowledge of the position of the coupling element on the trailer, the parking aid can adapt the output of obstacle warnings. If objects to which the parking aid would usually respond with obstacle warnings are detected near the coupling element on the trailer, with the disclosed embodiment, the warning strategy of the parking aid in the coupling mode is adapted such that no obstacle warnings related to the object are output. The driver of the transportation vehicle or the user of the transportation vehicle is thus not irritated by the parking aid during the process of maneuvering towards the target position by the trailer coupling assistant, because the parking aid ignores the approach to the coupling element on the trailer to the extent that no related obstacle warnings are output.

A further disclosed embodiment provides that if an object is disposed in the rearward monitoring region and within the specified perimeter around the position of the coupling element on the trailer, the parking aid does not output an audible obstacle warning, in particular, a continuous warning tone, which would otherwise be output in the standard mode. Alternatively or additionally, it is provided that if an object is disposed in the rearward monitoring region and within the specified perimeter around the position of the coupling element on the trailer, the parking aid does not carry out the display of a visible obstacle warning, in particular, in yellow and/or red signal colors, which would otherwise be displayed in the standard mode. If, for example, the transportation vehicle is at less than a distance of 30 centimeters from the coupling element on the trailer with a rear bumper, it could be provided in the standard mode of the parking aid that the parking aid outputs both a continuous tone and, for example, displays suitably red warning bars in a display in the transportation vehicle. In the coupling mode of the parking aid, i.e., when the trailer coupling assistant is activated, by contrast such obstacle warnings relating to being at less than a certain distance from the coupling element on the trailer are not carried out. A driver or user of the transportation vehicle is thus not irritated by audible and/or visible obstacle warnings relating to being at less than a certain distance from the coupling element on the trailer during the at least partly autonomous process of maneuvering the transportation vehicle to the target position.

An alternative disclosed embodiment provides that the position of the coupling element on the trailer is transmitted to the parking aid in the coupling mode and a lower distance value from an object, from which a highest warning level is reached in the standard mode for the parking aid, is reduced in relation to the coupling element on the trailer so that the highest warning level in the coupling mode is only reached if the transportation vehicle has reached the target position. For example, it can be provided in the standard mode of the parking aid that the highest warning level is reached once a certain region of the transportation vehicle is less than a distance of 30 centimeters from an object outside the transportation vehicle. With another disclosed embodiment, it is now provided that the lower distance value, for example, of 30 centimeters, is reduced so much at least in relation to the coupling element on the trailer that the highest warning level in the coupling mode is only reached if the transportation vehicle has reached the target position. Thus, for example, it can be provided that pauses between an output audible obstacle warning are reduced with reducing distance from the position of the coupling element on the trailer, wherein the audible obstacle warning is output as a continuous warning tone once the transportation vehicle has reached the target position. Alternatively or additionally, it can also be provided that with reducing distance from the position of the coupling element on the trailer a visible obstacle warning is first displayed in green, then in yellow and finally in red once the transportation vehicle has reached the target position. In other words, a threshold for the highest audible warning level and for the highest visible warning level may thus be shifted to the target position of the transportation vehicle, in which the trailer coupling of the transportation vehicle is disposed in the specified position for coupling to the coupling element on the trailer. During the approach to the target position, the audible and/or visible nature of the obstacle warnings changes. This enables a user or driver of the transportation vehicle to not be irritated by conflicting obstacle warnings during the at least partly autonomous process of maneuvering the transportation vehicle into the target position in which the trailer coupling of the transportation vehicle is disposed in the specified position for coupling to the coupling element on the trailer.

In a further disclosed embodiment, it is provided that the obstacle warning is output in the transportation vehicle and in the case of a maneuvering process that is remotely controlled by a remote controller the obstacle warning is output by the remote controller. For example, it is possible that a user of the transportation vehicle can control the coupling process remotely by the user's smartphone. In that case the obstacle warnings described above may also be output by the smartphone, wherein also in this case when the trailer coupling assistant is activated the parking aid is operated in the mentioned coupling mode, in which obstacle warnings relating to the rearward region are output by the parking aid differently from in the standard mode. Thus in the case of remote control of the transportation vehicle by the smartphone, the audible and/or visible obstacle warnings are output by the parking aid during the process of maneuvering into the target position differently than if, for example, a remote parking process is being carried out by the smartphone. If a driver or user of the transportation vehicle is standing outside the transportation vehicle while the transportation vehicle is being maneuvered towards the trailer, then the user is also not irritated by conflicting obstacle warnings output by the smartphone owing to an adjusted warning strategy on the part of the parking aid.

The disclosed system for supporting a process of coupling a transportation vehicle to a trailer comprises a trailer coupling assistant that is designed to detect a position of a coupling element on the trailer and based on this to maneuver the transportation vehicle at least partly autonomously into a target position in which a trailer coupling of the transportation vehicle is disposed in a specified position for coupling to the coupling element on the trailer, wherein the system comprises a parking aid that is designed to monitor a rearward monitoring region of the transportation vehicle during the maneuvering process. The system is in this case designed to operate the parking aid in a standard mode when the trailer coupling assistant is deactivated and when the trailer coupling assistant is activated to operate the parking aid in a coupling mode in which obstacle warnings relating to the rearward region are output by the parking aid differently from in the standard mode. Beneficial embodiments of the disclosed method are considered to be beneficial embodiments of the system and vice-versa, wherein the system comprises methods or mechanisms for carrying out the disclosed method.

The disclosed transportation vehicle comprises the disclosed system for supporting a process of coupling a transportation vehicle to a trailer.

In the figures identical or functionally identical elements have been provided with the same reference characters.

A transportation vehicle 1 comprising a system 2 for supporting a process of coupling the transportation vehicle 1 to a trailer 3 is shown in a schematic representation in FIG. 1. The system 2 comprises a trailer coupling assistant 4 that is designed to detect a position of a coupling element 5 on the trailer 3 and based on this to maneuver the transportation vehicle 1 at least partly autonomously into a target position in which a trailer coupling 6 on the transportation vehicle 1 is disposed in a specified position for coupling to the coupling element 5 on the trailer 3. The trailer coupling 6 of the transportation vehicle 1 can, for example, be a ball coupling and the coupling element 5 on the trailer 3 can, for example, be a trailer claw. Other disclosed embodiments of the coupling element 5 on the trailer 3 and the trailer coupling 6 on the transportation vehicle 1 are also possible.

The system 2 also comprises a parking aid 7 that is designed to monitor a rearward monitoring region B that is not shown here of the transportation vehicle 1 during the maneuvering process. The system 2 is in this case designed to operate the parking aid 7 in a standard mode when the trailer coupling assistant 4 is deactivated and when the trailer coupling assistant 4 is activated to operate the parking aid 7 in a coupling mode in which obstacle warnings relating to the rearward region B are output by the parking aid 7 differently from in the standard mode.

The trailer coupling assistant 4 can, for example, be coupled to a reversing camera that is not shown here, wherein, for example, the trailer coupling assistant 4 itself can carry out image processing to detect the coupling element 5 on the trailer 3. Based on the detected coupling element 5 on the trailer 3, the trailer coupling assistant 4 can, for example, determine the position of the coupling element 5 on the trailer 3 and based on this can maneuver the transportation vehicle 1 partly autonomously or fully autonomously into the mentioned target position, in which the trailer coupling 6 of the transportation vehicle 1 is disposed in a specified position for coupling to the coupling element 5 on the trailer 3.

In the target position, for example, it can be provided that the trailer coupling 6 of the transportation vehicle 1 must be disposed in a certain position below the coupling element 5 on the trailer 3. If the target position is reached, then the trailer 3 can be coupled to the transportation vehicle 1 quite easily, for example, by lowering a tow bar of the trailer 3 that is not referred to in detail here together with the coupling element 5 on the trailer 3 until the coupling element 5 on the trailer 3 encloses the trailer coupling 6 of the transportation vehicle 1.

The parking aid 7 can, for example, comprise a plurality of sensors that are not shown here that are distributed around the transportation vehicle 1, for example, as ultrasonic sensors, radar sensors and/or similar, by which very different objects near the transportation vehicle 1 can be detected. In order not to irritate a driver or user of the transportation vehicle 1 during the process of maneuvering into the mentioned target position, it is provided to operate the parking aid differently when the trailer coupling assistant is deactivated from when the trailer coupling assistant is activated. In the latter case, the parking aid 7 is operated in the mentioned coupling mode, in which obstacle warnings relating to the rearward region B are output by the parking aid 7 differently from in the standard mode.

In this case, the trailer coupling assistant 4 is not limited to only carrying out the mentioned process of maneuvering into the target position with the driver seated in the transportation vehicle 1. Alternatively or additionally, it can also be provided that a user or driver of the transportation vehicle 1 can activate the trailer coupling assistant 4 with the user's smartphone 8, so that the trailer coupling assistant 4 carries out the maneuvering process fully automatically, so that the transportation vehicle 1 approaches the mentioned target position fully autonomously, in which the trailer coupling 6 of the transportation vehicle 1 is disposed in the specified position for coupling to the coupling element 5 on the trailer 3. When controlling by the smartphone 8 it can be provided that warning indications or obstacle warnings are transmitted from the parking aid 7 to the smartphone 8 and are output visibly and audibly by the smartphone 8. Also in this case it is provided that the parking aid 7 is operated differently when the trailer coupling assistant 4 is deactivated from when the trailer coupling assistant 4 is activated, i.e., in the latter case in the mentioned coupling mode.

Figure 2:
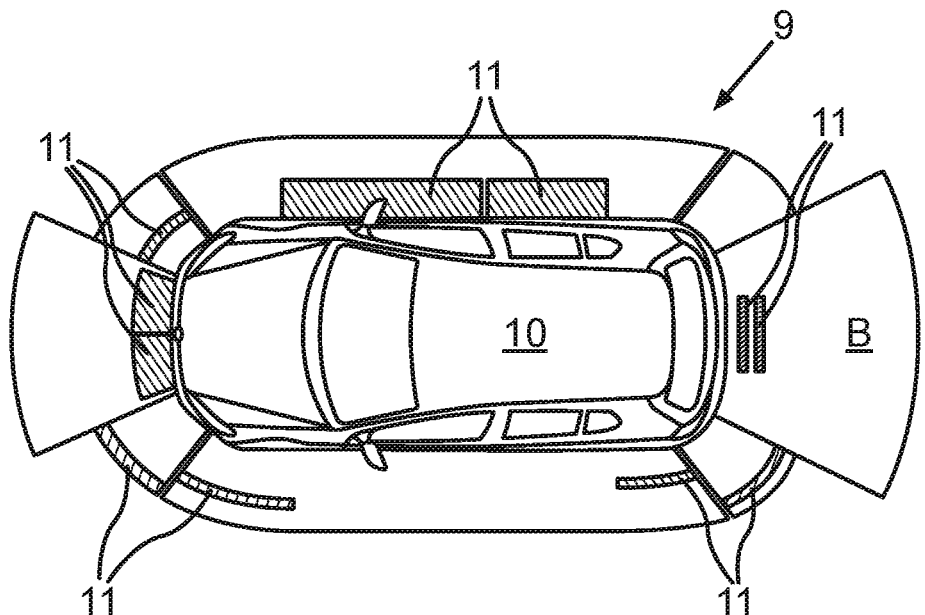
FIG. 2 shows a representation of a display of the transportation vehicle by which visible obstacle warnings are output during the process of coupling to the trailer.

FIG. 2 shows a display 9 of the transportation vehicle 1 by which an image 10 of the transportation vehicle 1 is displayed. The display 9 can, for example, be disposed in the region of a central console of the transportation vehicle 1. During the process of maneuvering or repositioning towards the trailer 3 the display 9, actuated by the parking aid 7, displays different visible warning indications as respective warning bars 11. During normal maneuvering with the transportation vehicle 1, it can be provided in a known way that the warning bars 11 can be displayed in different colors, from green through yellow to red, depending on how large the respective distances between objects in the surroundings of the transportation vehicle 1 and the transportation vehicle 1 are.

In the case of the embodiment that is shown here, it is provided that the position of the coupling element 5 on the trailer 3 is transmitted to the parking aid 7 in the coupling mode, wherein if an object is disposed in the rearward monitoring region B and within a specified perimeter around the position of the coupling element 5 on the trailer 3, the parking aid 7 does not output an obstacle warning that would otherwise be output in the standard mode.

For example, it could be provided in the standard mode that the parking aid 7 would display the warning bars 11 in the rear region of the image 10 of the transportation vehicle in red, for example, during reversing and when within a certain distance of a certain object. If the trailer coupling assistant 4 is active however, it is provided that the parking aid 7 effectively ignores the coupling element 5 on the trailer 3 entering the monitoring region B. If, for example, a bumper of the transportation vehicle 1 is within a distance of 30 centimeters from the coupling element 5 on the trailer 3, the parking aid 7, which is being operated in the coupling mode, still does not output either a visible or an audible warning. Thus, if an object is disposed in the rearward monitoring region B and within the specified perimeter around the position of the coupling element 5 on the trailer 3, the parking aid 7 does not carry out the output of both an audible obstacle warning and a visible obstacle warning, which would otherwise be output in the standard mode. Thus it neither sounds a continuous warning tone nor displays warning bars 11 in the rear region of the image of the transportation vehicle 1 by the display 9. A certain region around the coupling element 5 on the trailer 3 is thus masked or ignored by the parking aid 7 as long as the trailer coupling assistant 4 is active, in particular, if the parking aid is maneuvering the transportation vehicle 1 into the mentioned target position partly automatically or fully automatically.

Figure 3:
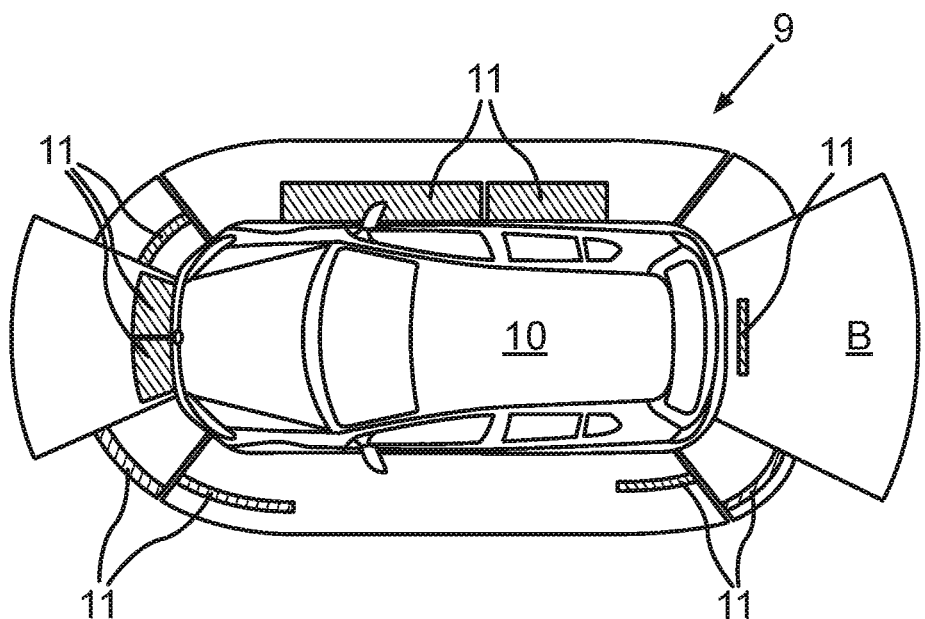
FIG. 3 shows a further representation of the display of the transportation vehicle by which, according to a second disclosed embodiment, visible obstacle warnings are output during the approach to the trailer.

In FIG. 3 the display 9 of the transportation vehicle 1 is shown again, wherein it is provided in the case that is shown here that in the coupling mode of the parking aid 7 the position of the coupling element 5 on the trailer 3 is transmitted to the parking aid 7 and a lower distance value from an object, from which a highest warning level is reached with the parking aid 7 in the standard mode, is reduced in relation to the coupling element 5 on the trailer 3 so much that the highest warning level in the coupling mode is only reached if the transportation vehicle 1 has reached the target position.

In this case, it can be provided that pauses between an output audible obstacle warning are reduced with reducing distance from the position of the coupling element 5 on the trailer 3, wherein the audible obstacle warning is output as a continuous warning tone once the transportation vehicle has reached the target position. In contrast thereto, in the standard mode the parking aid 7 would already output the continuous warning tone, for example, if the distance between a rear bumper of the transportation vehicle 1 and an object disposed in the rearward monitoring region B had become less than 30 centimeters, for example.

In addition, it can also be provided that with reducing distance from the position of the coupling element 5 on the trailer 3, a visible obstacle warning, for example, as the warning bar 11, is displayed in the rear region of the image 10 of the transportation vehicle 1 by the display 9, first in green, then in yellow and finally in red, once the transportation vehicle 1 has reached the target position. With the exemplary embodiment described in connection with FIG. 3, in other words it is thus provided to shift a threshold of the highest audible and visible warning level to the target position of the transportation vehicle 1, in which the trailer coupling 6 of the transportation vehicle 1 is disposed in the specified position for coupling to the coupling element 5 on the trailer 3. On reaching the target position, a continuous tone sounds, because only then is the highest warning level reached. The same also applies to the visual representation. Thus the warning bars 11 in the rear region of the image 10 of the transportation vehicle 1 are displayed in red by the display 9 if the transportation vehicle 1 has been maneuvered into the target position, in which the trailer coupling 6 of the transportation vehicle 1 is disposed in the specified position for coupling to the coupling element 5 on the trailer 3.

By use of both procedures described in connection with FIGS. 2 and 3, it can be ensured that a user or driver of the transportation vehicle 1 is not irritated by conflicting warning indications by the parking aid 7 during an at least partly autonomous process of coupling to the trailer 3.

REFERENCE CHARACTER LIST 1 transportation vehicle
2 system
3 trailer
4 trailer coupling assistant
coupling element on the trailer
6 trailer coupling of the transportation vehicle
7 parking aid
8 smartphone
9 display of the transportation vehicle
image of the transportation vehicle
11 warning bars
B rearward monitoring region

The invention claimed is:

1. A system for supporting a process of coupling a transportation vehicle to a trailer, the system comprising:
   a trailer coupling assistant to detect a position of a coupling element on the trailer, wherein the transportation vehicle at least partly autonomously maneuvers into a target position in which a trailer coupling of the transportation vehicle is disposed in a specified position for coupling to the coupling element on the trailer; and
   a parking aid to monitor a rearward monitoring region of the transportation vehicle during at least partly autonomous maneuvers,
   wherein the system operates the parking aid in a standard mode in response to the trailer coupling assistant being deactivated, and operates the parking aid in a coupling mode in which obstacle warnings relating to the rearward monitoring region are output by the parking aid differently from in the standard mode in response to the trailer coupling assistant being activated, wherein operation of the parking aid in the coupling mode includes ignoring an approach to the coupling element on the trailer such that no related obstacle warnings are output to reduce irritation to the user compared with the standard mode.

2. A transportation vehicle having a system for supporting a process of coupling the transportation vehicle to a trailer, the system comprising:
   a trailer coupling assistant to detect a position of a coupling element on the trailer, wherein the transportation vehicle at least partly autonomously maneuvers into a target position in which a trailer coupling of the transportation vehicle is disposed in a specified position for coupling to the coupling element on the trailer; and a parking aid to monitor a rearward monitoring region of the transportation vehicle during at least partly autonomous maneuvers, wherein the system operates the parking aid in a standard mode in response to the trailer coupling assistant being deactivated, and operates the parking aid in a coupling mode in which obstacle warnings relating to the rearward monitoring region are output by the parking aid differently from in the standard mode in response to the trailer coupling assistant being activated, wherein operation of the parking aid in the coupling mode includes ignoring an approach to the coupling element on the trailer such that no related obstacle warnings are output to reduce irritation to the user compared with the standard mode.

3. A method for supporting a process of coupling a transportation vehicle to a trailer, the method comprising:

detecting a position of a coupling element on the trailer by a trailer coupling assistant, wherein the transportation vehicle is at least partly autonomously maneuvered into a target position in which a trailer coupling of the transportation vehicle is disposed in a specified position for coupling to the coupling element on the trailer in response to a position of a coupling element on the trailer being detected by a trailer coupling assistant;

monitoring a rearward monitoring region of the transportation vehicle during at least partly autonomous maneuvers by a parking aid;

operating the parking aid in a standard mode in response to the trailer coupling assistant being deactivated; and operating the parking aid in a coupling mode in which obstacle warnings relating to the rearward monitoring region are output by the parking aid differently from in the standard mode in response to the trailer coupling assistant being activated, wherein operation of the parking aid in the coupling mode includes ignoring an approach to the coupling element on the trailer such that no related obstacle warnings are output to reduce irritation to the user compared with the standard mode.

4. The method of claim 3, further comprising transmitting the position of the coupling element on the trailer to the parking aid in the coupling mode in response to an object being disposed in the rearward monitoring region and within a specified perimeter around the position of the coupling element on the trailer, wherein the parking aid eliminates output of an obstacle warning that will otherwise be output in the standard mode.

5. The method of claim 4, wherein the parking aid eliminates output of an audible obstacle warning that will otherwise be output in the standard mode in response the object being disposed in the rearward monitoring region and within the specified perimeter around the position of the coupling element on the trailer.

6. The method of claim 4, wherein the parking aid eliminates display of a visible obstacle warning which will otherwise be displayed in the standard mode in response to the object being disposed in the rearward monitoring region and within the specified perimeter around the position of the coupling element on the trailer.

7. The method of claim 3, wherein in the coupling mode the position of the coupling element on the trailer is transmitted to the parking aid and a smaller distance value from an object, from which a highest warning level is reached in the standard mode of the parking aid, is reduced in relation to the coupling element on the trailer so much that the highest warning level in the coupling mode is only reached in response to the transportation vehicle reaching the target position.

8. The method of claim 7, further comprising reducing pauses between an output audible obstacle warning with reducing distance from the position of the coupling element on the trailer, wherein the audible obstacle warning is output as a continuous warning tone once the transportation vehicle has reached the target position.

9. The method of claim 7, wherein, with reducing distance from the position of the coupling element on the trailer, a visible obstacle warning is first displayed in green, then in yellow and finally in red once the transportation vehicle has reached the target position.

10. The method of claim 3, wherein the obstacle warning is output in the transportation vehicle and, in the case of at least partly autonomous maneuvers remotely controlled by a remote controller, the obstacle warning is output by the remote controller.

11. A system for supporting a process of coupling a transportation vehicle to a trailer, the system comprising:

a trailer coupling system including at least one camera for capturing images to detect a position of a coupling element on the trailer, wherein the transportation vehicle at least partly autonomously maneuvers into a target position in which a trailer coupling of the transportation vehicle is disposed in a specified position for coupling to the coupling element on the trailer; and a parking aid system including at least one sensor for monitoring a rearward monitoring region of the transportation vehicle during at least partly autonomous maneuvers, wherein the system operates the parking aid system in a standard mode in response to the trailer coupling system being deactivated, and operates the parking aid system in a coupling mode in which obstacle warnings relating to the rearward monitoring region are output by the parking aid differently from in the standard mode in response to the trailer coupling assistant being activated, wherein operation of the parking aid in the coupling mode includes ignoring an approach to the coupling element on the trailer such that no related obstacle warnings are output to reduce irritation to the user compared with the standard mode.

12. The system of claim 11, wherein the system transmits the position of the coupling element on the trailer to the parking aid system in the coupling mode in response to an object being disposed in the rearward monitoring region and within a specified perimeter around the position of the coupling element on the trailer, wherein the parking aid system eliminates output of an obstacle warning that will otherwise be output in the standard mode.

13. The system of claim 12, wherein the parking aid system eliminates output of an audible obstacle warning that will otherwise be output in the standard mode in response the object being disposed in the rearward monitoring region and within the specified perimeter around the position of the coupling element on the trailer.

14. The system of claim 12, wherein the parking aid system eliminates display of a visible obstacle warning which will otherwise be displayed in the standard mode in response to the object being disposed in the rearward monitoring region and within the specified perimeter around the position of the coupling element on the trailer.

15. The system of claim 11, wherein in the coupling mode the position of the coupling element on the trailer is transmitted to the parking aid and a smaller distance value from an object, from which a highest warning level is reached in the standard mode of the parking aid system, is reduced in relation to the coupling element on the trailer so much that the highest warning level in the coupling mode is only reached in response to the transportation vehicle reaching the target position.

16. The system of claim 15, wherein the system reduces pauses between an output audible obstacle warning with reduced distance from the position of the coupling element on the trailer, wherein the audible obstacle warning is output as a continuous warning tone once the transportation vehicle has reached the target position.

17. The system of claim 15, wherein, with reducing distance from the position of the coupling element on the trailer, a visible obstacle warning is first displayed in green, then in yellow and finally in red once the transportation vehicle has reached the target position.

18. The system of claim 11, wherein the obstacle warning is output in the transportation vehicle and, in the case of at least partly autonomous maneuvers remotely controlled by a remote controller, the obstacle warning is output by the remote controller.

* * * * *